Sept. 16, 1947.  R. J. THERIAULT  2,427,649
VEHICLE BODY ESPECIALLY ROOF STRUCTURE FOR BUSSES
Original Filed Dec. 1, 1939  4 Sheets-Sheet 1
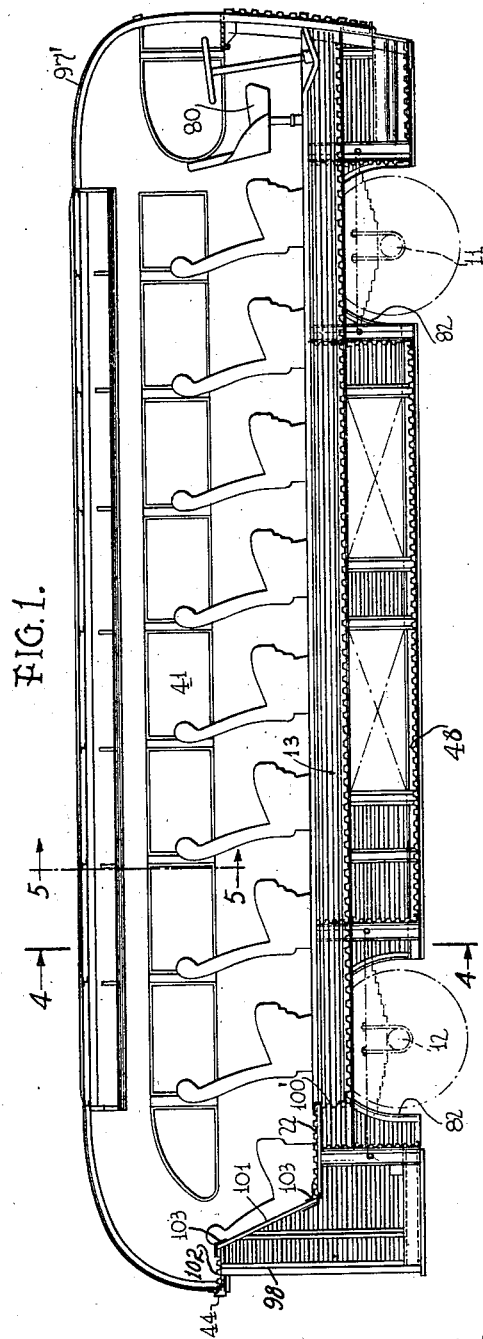
INVENTOR:
Raymond J. Theriault
BY John P. Tarbot
ATTORNEY.

INVENTOR.
Raymond J. Theriault
BY John P. Tarbox
ATTORNEY.

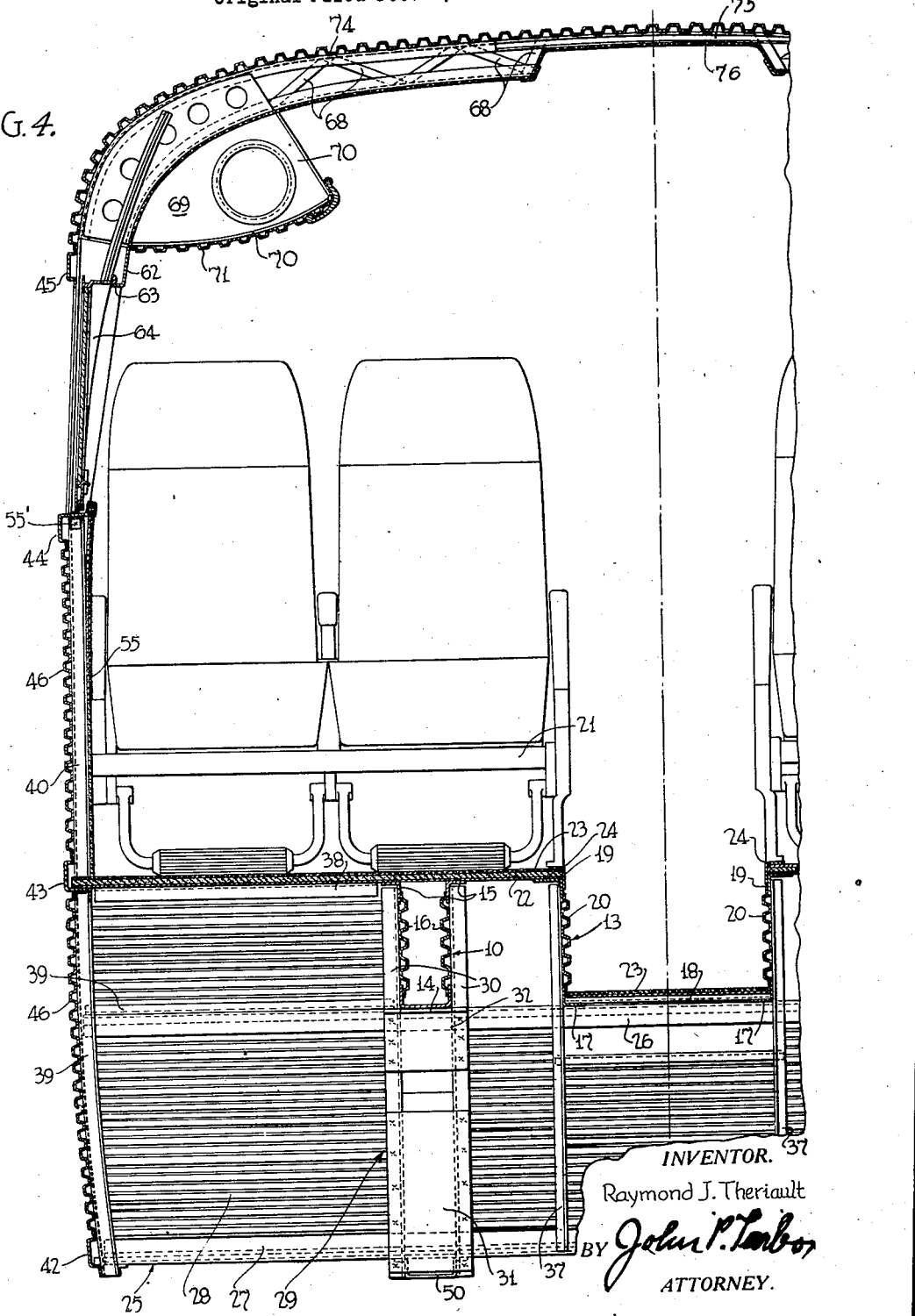

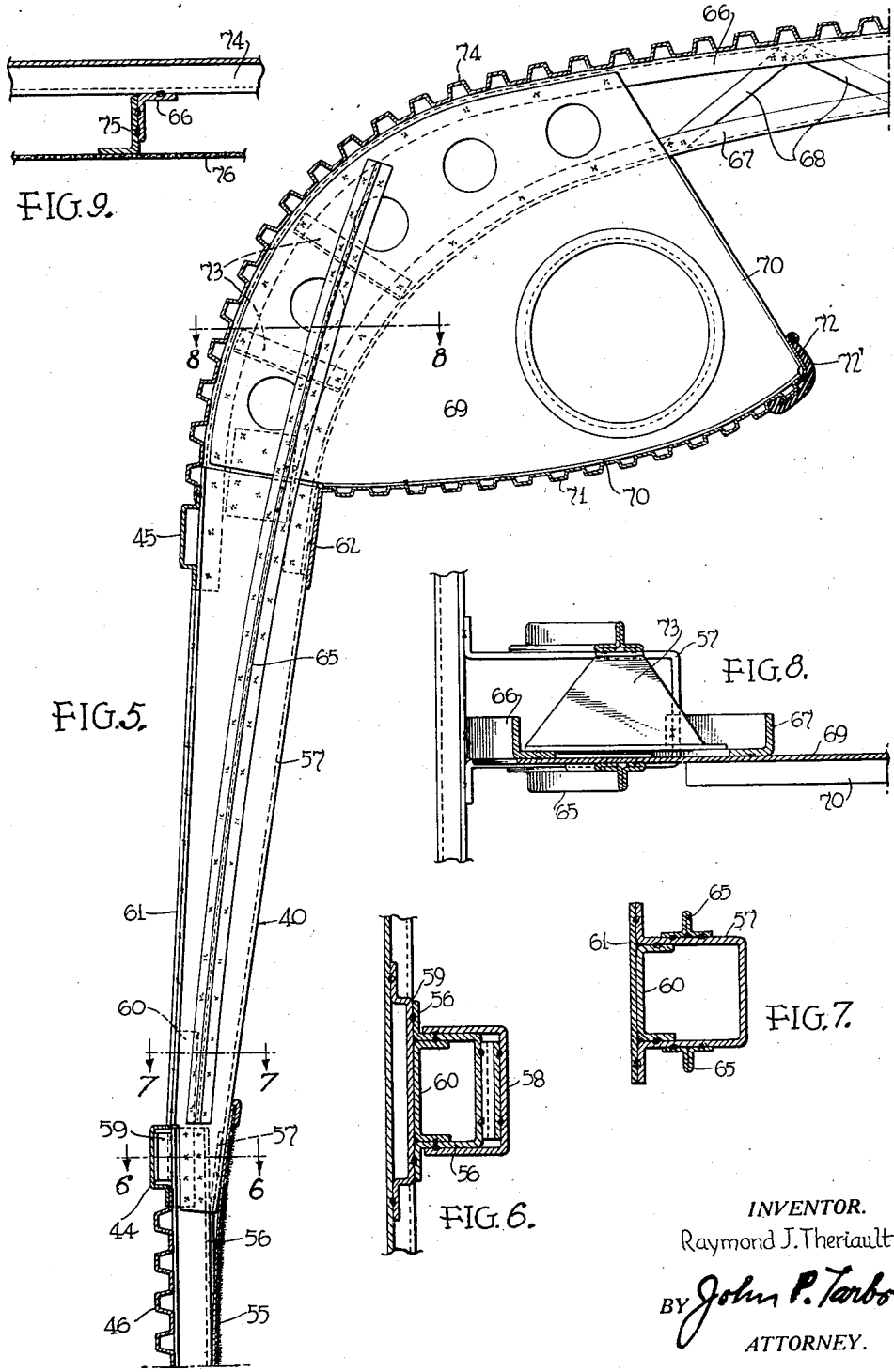

Patented Sept. 16, 1947

2,427,649

UNITED STATES PATENT OFFICE 2,427,649

VEHICLE BODY, ESPECIALLY ROOF STRUCTURE FOR BUSSES

Raymond J. Theriault, Glenside, Pa., assignor to The Budd Company, Philadelphia, Pa., a corporation of Pennsylvania Original application December 1, 1939, Serial No. 307,011. Divided and this application February 20, 1943, Serial No. 476,523

6 Claims. (Cl. 296—28)

The invention relates to vehicle bodies and more particularly to a vehicle body of the bus type as used for long distance travel. In such vehicles, the body is commonly of a width extending laterally beyond the wheels and the floor of the passenger compartment is for the most part above the wheel housings, the sides of the vehicle being extended down close to the ground and the space below the passengers' compartment being utilized for storage space, for baggage and spare tires, etc., and to provide engine room. Such buses usually carry the engine at the rear end transversely to the body, utilize the space below the floor of the passenger compartment for a luggage storage compartment; and the space at the front end under said floor may serve to receive the spare tire or tires.

It is an object of the invention to provide a vehicle body especially of the aforesaid class, which is light in weight, and has a very roomy interior and in which the walls of the body are all constructed as load-carrying members to take longitudinal and side collision shocks and so that the tubular body cross section formed by the side walls, roof and flooring acts as a tubular beam to carry the vertical loads between the front and rear wheel supports.

To achieve these objects in the highest degree the body is constructed in the main of a framework of angular, channel and/or box-cross section members fabricated out of light-gauge sheet metal of high tensile strength, such as stainless steel of the 18 and 8 variety, and the outer sheathing and flooring is for the most part built of corrugated metal strips with the corrugations so directed as to make the flooring and sheathing load-carrying members in combination with the members of the framework to which they are attached. The parts entering into the structure are so formed as to facilitate their joinder in the assembly by simple spot welding operations.

Another object of the invention is to strengthen and stiffen the upper side portions of the body and the roof so that they not only aid materially in carrying the vertical loads but are able to withstand lateral crushing forces such as are likely to result if the bus is turned over on its side or rolled over on its top. To this end the side walls in and above the windows region and the sides of the roof merging thereinto are strongly reinforced to form in effect a strong beam structure extending from end to end of the vehicle.

Such vehicles are ordinarily provided with a central longitudinally depressed floor portion or aisle and it is an object of the invention to increase the headroom above this aisle without increasing the overhall height of the vehicle. This is achieved by making the roof in this central area of a minimum thickness consistent with adequate strength to avoid crushing.

Other objects are to increase the longitudinal buffing strength of the vehicle body to take care of end collision shocks as well as to carry the loads normally expected. To this end the side walls, roof and underframing and flooring attached thereto, are all strengthened and reinforced and interbraced to make all of them assist in taking such shocks.

Other and further objects and advantages and the manner in which they are attained will become apparent from the following detailed description when read in connection with the drawings forming a part hereof.

In the drawings:

Fig. 1 is a central vertical longitudinal sectional view of a bus body according to the invention;

Fig. 4 is a transverse vertical sectional view on an enlarged scale through the vehicle body, the section being extended beyond the center line of the body and being taken substantially along the line 4—4 of Fig. 1;

Fig. 5 is a fragmentary transverse sectional view through the upper part of the side wall and the side of the roof taken on the section line 5—5 of Fig. 1;

Figs. 6, 7, 8, are fragmentary detail sectional views on an enlarged scale taken, respectively, on the correspondingly numbered lines of Fig. 5;

Fig. 9 is a detail longitudinal vertical sectional view through the central portion of the roof.

In the sectional views the sections are taken looking in the direction of the arrows at the ends of the section lines.

The vehicle body according to the invention has its underframe, the side walls and the roof all so constructed and tied together that the ensemble provides in effect, a tubular beam supported adjacent its ends by the front and rear wheels and axles. To achieve maximum lightness of weight, the construction provides that all the walls of the body mentioned assist in carrying the vertical loading.

Figure 3:
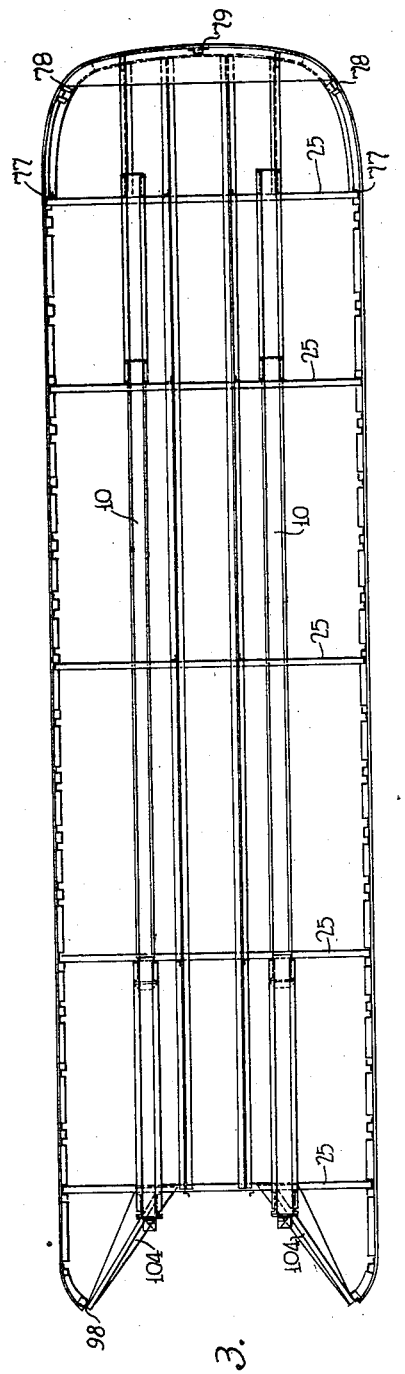
Fig. 3 is a sectional plan view of the framework, the section being taken on the line 3—3 of Fig. 2.
Figure 2:
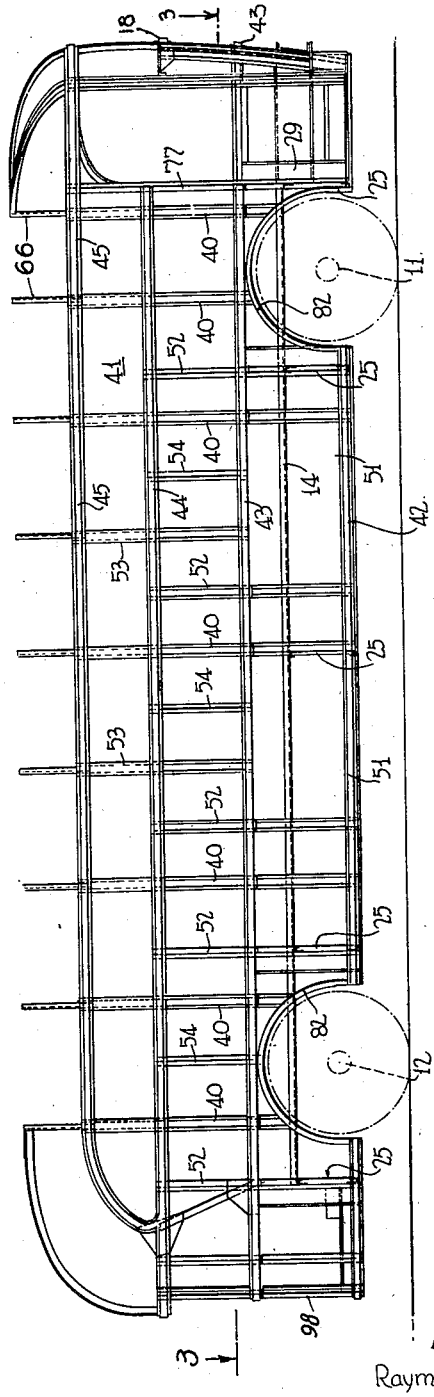
Fig. 2 is a diagrammatic side elevational view showing the principal framework of the body.

As shown in Figures 1 to 4, the main longitudinal members of the underframe may comprise the vertically deep box section and rectilinear beams 10 spaced from each other and from the side walls of the body and arranged symmetrically on opposite sides of the vertical central plane of the body. As shown in Figures 2 and 3, these members extend from a location in front of the front wheels and their associated axle 11 rearwardly over the rear wheel axle 12 and terminate at the rear some distance beyond the rear wheels.

An additional longitudinal load-carrying structure of the underframe extending between and beyond the front and rear axles is a wide and deep channel designated generally by the reference numeral 13, this channel being of a depth substantially equal to the depth of the members 10 and having its top in the plane of the tops of these members. The tops of the members 10 and 13 define the general floor plane of the passenger compartment, which plane is well above the wheels so as to permit vertical movement of the wheels and axles with respect to the body without having the wheels contact the flooring.

The main longitudinal members 10 may, for lightness of construction, be built up of a bottom channel chord 14 and top spaced angles 15, the angles 15 being connected with the opposite side walls of the channel by longitudinally corrugated web plates 16.

Similarly the channel 13 may comprise a bottom shallow channel chord formed by spaced angles 17 interconnected by transversely corrugated floor sheeting 18 which forms a depressed aisle flooring running substantially throughout the length of the vehicle body. The channel member 13 has spaced top angles 19, the bottom and top angles 17 and 19 of each side being interconnected by longitudinally corrugated web plates 20.

The main raised portion of the flooring from which the seats 21 are supported comprises transversely corrugated floor sheeting 22 secured to the laterally extending arms of the angles 15 and 19. The sides of the floor sheeting are secured to the side walls in the manner subsequently to be described.

The corrugations of the floor sheeting 18 and 22 are filled with a suitable sound deadening and wear resisting filler 23 such as cork or a cork product or the like. As shown in Figure 4, the edges of this filler are protected at the sides of the channel 13 by angular metal finish members as 24 secured to the angles 19.

The main longitudinal members 10 and 13 and the floor sheeting 22 which interconnects them are further transversely connected to each other and to the side walls of the body by spaced transverse bulkheads indicated generally in Figure 3 by the reference numeral 25. Two of these bulkheads are arranged adjacent to and fore and aft of each of the front and rear wheels while the fifth one is arranged at an intermediate point. These bulkheads stabilize and strengthen the longitudinal members of the underframe and tie them into the side walls and enable a substantial portion of the vertical loading to be carried by the side walls.

Since these bulkheads are all essentially similar in construction, a description of one of them will suffice. As shown in Figure 4, each bulkhead may comprise an upper channel 26 and a lower channel 27, these channels extending from side to side of the body for securement to the side walls. The upper channel 26 is secured through its bottom wall to the laterally extending arms of the angles 17 and to the bottom walls of the channels 14. The vertically spaced channels 26 and 27 are interconnected by transversely corrugated sheeting 28 extending from side to side of the body. To further stiffen and strengthen the bulkheads and to provide anchorage for the spring suspension in the bulkheads adjacent the wheels, they are strongly reinforced in direct vertical alignment with the beams 10 by vertical struts designated generally by the reference character 29. These verticals struts may comprise spaced channels 30 overlapping at their tops the opposite sides of the beams 10 and secured thereto and extended down to the bottom of the body. The side walls of the channels adjacent the transversely corrugated sheeting 28 of the bulkhead are secured to this sheeting and to the top and bottom channels 26 and 27 of the bulkhead. The opposite sides of the channels are connected by flat plates 31 and additionally by an angle 32, in the intermediate bulkheads 25, the horizontal arm of this angle being secured to the bottom wall of the channel 14.

Each bulkhead may be further reinforced as shown in Figure 4 by angle members 37 extending from the bottom of the bulkhead to the flooring 22, these angles overlapping the bulkhead members 26, 27 and 28 and secured thereto and in their upper extended portions overlapping the side walls of the aisle channel 13 and secured thereto. Laterally of the main longitudinal frame members 10, the corrugated bulkhead sheeting 28 may be extended upwardly to the flooring and secured at the top to the flooring 22, through an angle 38 and to the channel 26, at the bottom by another angle 39. Between the central channel 13 and the main beams 10 and below the channel 13 the bulkhead sheeting may be omitted as shown in Fig. 4 to provide longitudinal openings through which ventilating ducts, piping and wiring conduits may extend.

From the foregoing description, it will be seen that the bulkheads form a very strong transverse reinforcement between the side walls, the flooring and the main longitudinal members of the underframe tying these parts together and stabilizing the longitudinal members against bending or distortion under normal vertical loading or when subjected to collision shocks.

The side walls are constructed as transversely thin vertically deep plate girder structures adapted to carry a substantial part of the vertical load between the points of suspension. These side wall structures each comprise longitudinally spaced posts 40 (see Figure 2) extending from above the window openings 41 below the floor level to the bottom of the side wall of the body, which except at the wheel housings, is located a substantial distance below the floor level and adjacent the roadway. These vertical posts are interconnected at the bottom by a longitudinal member or bottom rail 42, at the floor level by a longitudinal member or floor rail 43, below the window openings by a longitudinal member or belt rail 44 and at the top of the window openings by a longitudinal member or top rail 45' As shown in Figures 2, 4 and 5, the posts 40 may be of outwardly facing flanged channel section and the longitudinal members 42 to 45 inclusive may be inwardly facing flanged channel members to the posts through the overlapping flanges of these members and the post flanges. Between the members 42 and 43 and 43 and 44 the longitudinally corrugated sheeting 46 is applied to the posts and secured thereto, the top and bottom margins of this sheeting being secured also to the adjacent marginal flanges of the members 42, 43, 44.

As shown in Figure 4, the longitudinal member 43 has its lower side wall deepened between the posts and the floor sheeting 22 has its lateral edge extended over this deepened side wall and secured thereto as by spot welds.

At the bottom the side walls of the vehicle are further interconnected by transversely corrugated sub-floor sheeting 48 which overlaps the bottom wall of the channel 42 at the sides and is secured thereto. The ends of this sub-floor sheeting are secured to the channels 27 of the bulkheads 25 arranged longitudinally inwardly of the wheels. In line with the vertical struts 29 the corrugated sub-flooring is reinforced from the bulkhead longitudinally inward of the front wheels to the bulkhead just forward of the rear wheels by flanged channel members 50 welded to the sheeting 48 through the flanges thereof (see Figure 4). This transversely corrugated sub-floor sheeting 48 not only interbraces the side walls at their lower margins but serves as a floor for a baggage compartment or compartments provided between the inwardly located bulkheads adjacent the wheels, the flooring and the side walls. Access may be had to this baggage storage space through door openings 51 normally closed by doors (not shown).

The side wall plate girder structures are further reinforced and stabilized to carry the vertical loading by vertical posts 52 located between certain of the posts 40 and extending from the bottom of the window openings to the bottom of the body. Other posts as 53 like the posts 40 extend above the window opening but unlike the posts 40 terminate at the floor level. Still further posts as 54 merely extend from the floor rail 43 to the lower window rail 44. As shown in Figures 2 and 3, some of these posts are of flanged channel cross-section while others are of Z cross-section, but in all cases, they provide a flange or flanges which overlap the sheeting and through which they are secured thereto and an inner longitudinally extending face against which the inner trim 55 may be secured.

The side wall plate girders are of course, strongly connected to the bulkheads by having the transverse channels 26, 27, and the corrugated sheeting 28 thereof overlapping posts of the side walls arranged in the transverse planes of the bulkheads and strongly secured together in the overlap, see Figs. 2, 3, and 4. Thus the side walls are stabilized by the bulkheads and vertical loading therein is carried through the bulkheads to the main longitudinal members of the underframes and to the wheels and axles.

The posts 40 and 53 which extend upwardly between the window openings to support and secure the roof structure are of especially reinforced construction in their upper regions as shown in the typical construction illustrated in Figures 5 to 8 inclusive. These posts are comprised of a lower portion 56 of uniform cross-section terminating at the bottom of the window opening and an upper portion 57 which extends some distance below the window opening and is of an increasing depth from below the window opening to its upper end above the window opening. This upper portion 57, like the lower portion 56, may comprise a flanged channel, the flanges of which form outer abutments for a window but in the portion thereof which extends below the window opening these flanges are cut away and the side walls of the channel overlap the side walls of the lower post portion 56 and are welded thereto (see Fig. 6). Additional strength in the joint is secured by a plain strip 58 welded to the bottom wall of the channel 57 and to the bottom wall of the channel 56. The post in this region as shown in Figure 6 is additionally tied to the longitudinal rail 44 by a flanged channel bridging member 59 which has its flanges secured to the bottom of the channel 44 and its bottom wall secured to the flanges of the channel post portion 56. An additional channel member 60 overlapping the side walls of the post portions 56 and 57 and secured thereto forms a further reinforce for the joint. As shown in Figures 4 and 5, the upper flange of the flanged channel 44 is cut away in the region of the posts but between the posts the upper side wall of the channel is extended inwardly to form the window sill and is flanged upwardly and to this edge flange the inner trim 55 may be secured. Angles, as 55', may secure this inwardly extended upper side wall of the channel 44 to the posts, as 40, see Fig. 4. Between the longitudinal rails 44 and 45 the post portion 57 is closed to box-section form by a flat closing plate 61 welded to the flanges of the channel 57 of the post.

At the top the post portions 57 are connected on their inner sides by an angle member 62 extending longitudinally across the posts, this angular member having an inwardly extending flange 63, Fig. 4, between the posts forming abutments for the tops of the windows. The windows 64 are shown as vertically movable windows and they are guided for this movement by curved window guides 65 secured to the opposite side walls of the channels 57 extended thereabove and secured to the roof structure in a manner to be subsequently described.

As shown in Figures 4 and 5, the posts in the window region are inclined inwardly and above the window openings a transversely arched roof section is secured thereto. This roof section may comprise longitudinally spaced outer angles 66 which overlap one side wall of the upper portions of the channel section posts 57 (see Figures 5 and 8) and are secured thereto, these angles extending from side to side of the body and conforming to the arched form of the roof. Inner arched angle members 67 spaced from the members 66 and secured at their outer ends to the bottom and side walls of the tops of the respective channel posts 57 terminate short of the central longitudinal plane of the body and form with the members 66 and the diagonal struts 68 interconnecting them vertically deep transverse roof members in the lateral regions of the roof. At the side where the roof curves into the side wall each pair of angles 66 and 67 is further interconnected by a plate 69, this plate being of generally triangular shape and extending inwardly beyond the members 67 to form a bracket. Lightening holes may be provided in this plate as shown in Figures 4 and 5 and the portion thereof projecting beyond the members 67 may be flanged laterally at 70. To the lower flanged margins of these members 69 which are shown curved and inclined inwardly and upwardly is secured the through-running longitudinally corrugated sheet 71 the outer margin of which is secured to the longitudinal member 62 and the inner margin of which is secured to the upwardly extended portion 72 which itself is secured to the inner upwardly extending flange 70 of the plate 69. The parts 69, 71 and 72 form a rack for small parcels which extends, as shown in Figure 1, for substantially the length of the vehicle. A rubber bumper 72' may be secured to the inner margin of the rack, see Fig. 5.

The window guide 65 at one side of the post portion 57 is extended above the post and secured in this extended portion to the plate 69. The window guide 65 on the other side of the post 57 is supported in the region above the post by several transverse brackets 73 which are connected to the angles 66 and 67 as shown in Figure 8.

The transverse members 66 of the roof are tied together throughout their length by the longitudinally corrugated roof sheeting 74 extending from the top side rail 45 and secured thereto to the similar top side rail on the opposite side of the body.

The roof and top side wall structure as described forms a very stiff longitudinally extending beam structure at the side edge of the roof which is tied into the deep transverse cantilever beams formed by the reinforced tops of the posts and the transverse vertically deep side portions of the transverse members of the roof, producing an ensemble which is capable of withstanding severe lateral thrusts such as would occur if the vehicle body should be overturned.

The central portion of the roof is made, as shown in Figures 4 and 9, of very shallow vertical depth, the transverse angles 66 in this region each being reinforced by an angle 75, to the horizontally extending arms of which the inner lining 76 may be secured. The sides of this vertical shallow portion merge into the deeper side portions by downwardly and outwardly inclined faces conforming to the inner diagonal struts 68, and these faces may serve for the location of lighting and ventilating members. The deep side portions of the roof are well adapted to house portions of the ventilating duct system and the shallow central portion of the roof provides additional head room in the central aisle section of the vehicle so that even the tallest passengers can walk upright without adding to the overall height of the vehicle.

The side walls may be said to terminate at the front in the vertical posts 77 which are shown as Z-sectioned members (see Figures 2 and 3) secured to the foremost bulkhead 25 and extending from the bottom of the body to the top window rail 45. The post 77 at the right-hand side of the body forms the rear margin of the door opening in this side of the body. This post 77 is arranged very close to the foremost post 40 in the side wall and these two posts together by reason of their strong interconnection by the numerous longitudinal members and the paneling between the longitudinal members form a very strong connection to the roof to transmit compression loading into the roof.

From the post 77 forward the sides merge into the rounded front end of the body, this portion being rounded in plan as well as in elevation to give it a pleasing appearance. The frame-work of this rounded front end comprises two lateral posts 78 of flanged channel section and a central post 79 of similar section, these posts extending from the bottom of the body up over the roof to the first transverse roof frame member 66 to which they are secured. These post members 78 and 79 are secured together at the top by the top side rail 45 or a continuation thereof extended around the front of the body from side to side as clearly appears in Figure 2.

The window openings provided in this front between the posts are of greater vertical height than the side window openings so as to give the driver seated on the driver's seat 80, Figure 1, a more extended vision. As a consequence, the lower window rail 81 extending around the front is at a lower level than the lower window rail 44 in the side walls. The floor rail 43 of the side walls may, however, be extended around the front in a manner similar to the top rail 45 except where it is interrupted by the openings, such as the doorway opening at the right hand side, and the same is true, to some extent, of the bottom rail 42 which is extended at least partly around the front end from its sides.

It might be pointed out here that the bottom rectilinear rails 42 at the sides are continued through the arched wheel housing portions of the side walls by correspondingly arched angular members 82 secured to the outer sheeting in the margins of these wheel housing openings. The corrugated paneling 46 of the side walls is also extended around the front end, and the paneling, rails and posts are strongly secured together in a manner similar to the joinder of these parts in the side walls.

The compound curved forward portion of the roof in front of the first transverse member 16 may be covered by plain sheeting 97' (see Figure 1) which conforms to the curvature of this portion of the roof.

The side walls are extended rearwardly of the rear bulkhead 25 and each terminates at its slightly in-turned rear portion in a strong vertical post 98 of longitudinally presenting channel section. Between these posts the space below the bottom window rail 44 which is continued around the rounded rear end and the bottom rail 42 is open and normally closed by a pair of doors (not shown) one hinged to each post 98.

As shown in Figure 1 the central channel 13 terminates short of the rear bulkhead in a vertical transverse panel 100' and from this point to some distance rearwardly of the bulkhead the transverse flooring 22 extends from side to side of the body. From this rear portion of the floor plating 22 extends a rearwardly and upwardly inclined transverse wall 101 which may be of vertically corrugated sheeting, the top of this wall terminating in the plane of the longitudinal member 44 and the space between the top of this wall 101 and the member 44 being bridged by a shelf which may also be made of transversely corrugated plating designated 102. The floor paneling 22 and the corrugated sheeting 101 and 102 may be joined together in their adjacent edges by angles designated generally 103 and welded through their arms respectively to the adjacent edges of the panels.

From the foregoing description, it will be seen that the space below the panels 102, 101 and that portion of the flooring 22 extending rearwardly of the bulkhead is open to provide a housing for the usual transversely located engine unit.

To support this engine unit and to extend the main longitudinal members 10 to the rear end of the body to transmit collision shocks directly to these members, inclined braces 104 are provided extending from the rear bulkhead 25 in the region of its connection to the longitudinal members 10 to the side posts 98.

In the foregoing detailed description, a specific form in which the invention may be embodied has been described but it will be understood that changes and modifications in the structure may be made by those skilled in the art without departing from the spirit and scope of the invention and such modifications are intended to be covered by the appended claims. Reference is made to applicant's application Serial No. 307,011, filed December 1, 1939, for Vehicle body, now Patent No. 2,330,182, granted September 21, 1943, of which the present application is a division.

What is claimed is:

1. A roof construction for vehicles having spaced transverse members comprising an angular member extending from side to side and adapted for connection to the posts of the side walls, another inwardly spaced angular member also adapted for connection to said posts and terminating short of the central plane of the body, means connecting said members to constitute a truss structure, the central portion of said first-named member being reinforced by an angular member to which the inner lining is directly applied, the first-named member supporting longitudinally corrugated sheathing directly secured thereto.

2. A vehicle body construction comprising side walls having posts extending upwardly between window openings to support a roof, said posts increasing in transverse depth from the bottom of the window openings to the roof, and merging into transverse curved roof members, plate-like brackets structurally secured to the sides of said transverse roof members and extending inwardly therebeyond, longitudinally corrugated sheeting structurally connected to the outer faces of said transverse roof members, and similar sheeting connected to the bottom of said plate-like brackets, whereby said sheetings together with the roof members and the brackets form on each side of the body hollow section girders of great cross-sectional area which are securely tied into the side walls by means of said posts.

3. In a vehicle body construction having a side wall, a roof and longitudinally spaced transverse frame members, said side wall merging into the roof through an arched portion, said transverse members extending across said arched portion and being secured to the adjoining portions of side wall and roof, said members also extending inwardly and having wide sides facing in the longitudinal direction of the body, plate-like brackets overlapping and structurally secured to the wide sides of said transverse members and extending inwardly therebeyond, said brackets each having a lower generally horizontal edge and a generally upright inner edge, longitudinal sheeting extending over the width of and structurally secured to said lower edges of the brackets, the sheeting having an inner upturned marginal portion structurally secured to the lower ends of the vertically extending edges of the brackets, said sheeting extending uninterruptedly over a major portion of the length of the body and constituting a strong reinforcement of the construction.

4. In a vehicle body having a longitudinal aisle and a roof extending in a smooth curve from side to side of the body and reinforced by longitudinally spaced transverse beams, said beams extending uninterruptedly across the entire width of the body and having throughout an outer chord, an inner chord and a web interconnecting said chords, an outer skin being secured to the continuously curved outer chords, abrupt upward offsets of the central portions of said inner chords and of the lower margins of said webs above the aisle relative to the lateral portions thereof, whereby the beams have great height and correspondingly great strength in the regions of the body on both sides of the aisle and have reduced height and correspondingly increased head room above the aisle.

5. In a body for a vehicle such as a bus: a pair of opposite load-carrying side walls and a load-carrying roof, said walls and roof merging into each other by generously curved upper corner portions; side wall posts; roof beams extending across the width of the body; each two of said posts and one of said beams being integrally and stress-transmittingly connected with each other into units; the transverse width of said units gradually increasing from mid regions of the side walls and the roof to about the middle of said corner portions, and said units being composed in the region of said corner portions of inner and outer chord structures interbraced by a web structure, said units greatly increasing the strength of the corner portions of the body against lateral impacts of the nature to which the body is subjected when overturning in an accident.

6. In a body for a vehicle such as a bus; a pair of opposite load-carrying side walls and a load-carrying roof, said walls and roof merging into each other by generously curved upper corner portions; roof beams extending across the width of the body and pairs of opposite side wall posts being integrally and stress-transmittingly connected with said beams into units; the transverse width of said units gradually increasing to at least double width from mid regions of the side walls and the roof to about the middle of said corner portions and said units being composed in the region of said corner portions of inner and outer chord structures interbraced by a web structure, said units greatly increasing the strength of the corner portions of the body against lateral impacts of the nature to which the body is subjected when overturning in an accident.

RAYMOND J. THERIAULT.

REFERENCES CITED

The following references are of record in the file of this patent:

UNITED STATES PATENTS

| Number | Name | Date |
| --- | --- | --- |
| 2,294,363 | Brockway | Sept. 1, 1942 |
| 2,268,502 | Browne | Dec. 30, 1941 |
| 1,615,164 | Brown | Jan. 18, 1927 |
| 578,356 | Palmer | Mar. 9, 1897 |
| 2,250,523 | Christiansen et al. | July 29, 1941 |
| 2,093,859 | Austin | Sept. 21, 1937 |
| 1,727,721 | Langlands et al. | Sept. 10, 1929 |
| 2,075,096 | Crommey | Mar. 30, 1937 |
| 2,159,783 | Dayes | May 23, 1939 |
| 2,250,619 | Austin | July 29, 1941 |
| 1,675,539 | Forrester | July 3, 1928 |
| 2,171,434 | Ragsdale et al. | Aug. 29, 1939 |
| 1,622,240 | Stahl | Mar. 22, 1927 |
| 2,198,579 | Mayer | Apr. 23, 1940 |
| 2,033,069 | Hagen et al. | Mar. 3, 1936 |
| 2,198,792 | Schjolin | Apr. 30, 1940 |
| 2,178,644 | Piron | Nov 7, 1939 |